United States Patent
Forstpointner et al.

(10) Patent No.: US 10,537,899 B2
(45) Date of Patent: Jan. 21, 2020

(54) SILICON SEED PARTICLES FOR THE PRODUCTION OF POLYCRYSTALLINE SILICON GRANULES IN A FLUIDIZED BED REACTOR

(71) Applicant: Wacker Chemie AG, Munich (DE)

(72) Inventors: Gerhard Forstpointner, Kastl (DE); Rainer Hauswirth, Kirchdorf (DE)

(73) Assignee: WACKER CHEMIE AG, Munich (DE)

(*) Notice: Subject to any disclaimer, the term of this patent is extended or adjusted under 35 U.S.C. 154(b) by 443 days.

(21) Appl. No.: 15/316,931

(22) PCT Filed: Jun. 2, 2015

(86) PCT No.: PCT/EP2015/062274
§ 371 (c)(1),
(2) Date: Dec. 7, 2016

(87) PCT Pub. No.: WO2015/189072
PCT Pub. Date: Dec. 17, 2015

(65) Prior Publication Data
US 2017/0113228 A1    Apr. 27, 2017

(30) Foreign Application Priority Data

Jun. 10, 2014 (DE) .................. 10 2014 211 037

(51) Int. Cl.
*B02C 19/06* (2006.01)
*C01B 33/021* (2006.01)
*C04B 35/56* (2006.01)

(52) U.S. Cl.
CPC .......... *B02C 19/068* (2013.01); *C01B 33/021* (2013.01); *C04B 35/5626* (2013.01);
(Continued)

(58) Field of Classification Search
CPC . B02C 19/068; C01B 33/021; C04B 35/5626; C04B 2235/3839;
(Continued)

(56) References Cited

U.S. PATENT DOCUMENTS

| 4,786,477 A | 11/1988 | Yoon et al. |
| 4,945,073 A | 7/1990 | Dubensky et al. |

(Continued)

FOREIGN PATENT DOCUMENTS

| DE | 10052021 B4 | 4/2002 |
| DE | 10 2005 039 118 A1 | 2/2007 |

(Continued)

*Primary Examiner* — Omar Flores Sanchez
(74) *Attorney, Agent, or Firm* — Brooks Kushman P.C.

(57) ABSTRACT

Silicon seed particles which can be used for producing polycrystalline silicon granules in a fluidized-bed reactor are prepared by a process wherein a milling gas stream is introduced into a chamber containing polycrystalline silicon granules, as a result of which individual particles of the polycrystalline silicon granules are accelerated in such a manner that they collide with other particles of the polycrystalline silicon granules, and in this manner the polycrystalline silicon granules are comminuted, wherein the milling gas stream is introduced into the chamber by at least one jet nozzle made of hard metal.

11 Claims, 4 Drawing Sheets

(52) U.S. Cl.
CPC ......... *C04B 2235/3839* (2013.01); *C04B 2235/3843* (2013.01); *C04B 2235/3847* (2013.01); *C04B 2235/405* (2013.01)

(58) Field of Classification Search
CPC .... C04B 2235/3843; C04B 2235/3847; C04B 2235/405
See application file for complete search history.

(56) References Cited

U.S. PATENT DOCUMENTS

| | | |
|---|---|---|
| 5,334,561 A | 8/1994 | Matsui et al. |
| 5,637,815 A | 6/1997 | Takahata et al. |
| 5,918,102 A | 6/1999 | Friederichs |
| 7,490,785 B2 | 2/2009 | Weidhaus |
| 7,549,600 B2 | 6/2009 | Hesse et al. |
| 2002/0059849 A1 | 5/2002 | Perez et al. |
| 2005/0189443 A1* | 9/2005 | Taylor ............... B05B 1/00 239/591 |
| 2007/0040056 A1 | 2/2007 | Weidhaus |
| 2010/0072311 A1* | 3/2010 | Tanaka ............ B02C 19/068 241/5 |
| 2011/0073689 A1 | 3/2011 | Paulat et al. |

FOREIGN PATENT DOCUMENTS

| | | |
|---|---|---|
| EP | 0 476 632 A2 | 3/1992 |
| JP | S5767019 A | 4/1982 |
| JP | 61223145 A2 | 10/1986 |
| WO | 98/03691 A1 | 1/1998 |

\* cited by examiner

SILICON SEED PARTICLES FOR THE PRODUCTION OF POLYCRYSTALLINE SILICON GRANULES IN A FLUIDIZED BED REACTOR

CROSS REFERENCE TO RELATED APPLICATIONS

This application is the U.S. National Phase of PCT Appln. No. PCT/EP2015/062274 filed Jun. 2, 2015, which claims priority to German Application No. 10 2014 211 037.8 filed Jun. 10, 2014, the disclosures of which are incorporated in their entirety by reference herein.

BACKGROUND OF THE INVENTION

1. Field of the Invention

The invention relates to silicon seed particles for producing polycrystalline silicon granules in a fluidized-bed reactor.

2. Description of the Related Art

Polycrystalline silicon granules are an alternative to the polysilicon produced in the Siemens process. Whereas the polysilicon in the Siemens process is produced as a cylindrical silicon rod which, before further processing thereof, must be time-consumingly and expensively comminuted to form what is termed chip poly and optionally again purified, polycrystalline silicon granules have bulk goods properties and can be directly used as raw material, eg for single-crystal production for the photovoltaics and electronics industry.

Polycrystalline silicon granules are produced in a fluidized-bed reactor. This is achieved by fluidizing silicon particles by means of a gas stream in a fluidized bed, wherein the fluidized bed is heated up to high temperatures via a heating device. By adding a silicon-containing reaction gas, a thermochemical reaction proceeds, wherein elemental silicon is deposited on the hot particle surface. The individual particles grow in diameter. By regular takeoff of grown particles and addition of smaller silicon seed particles, the process can be operated continuously, with all of the advantages associated therewith. As silicon-containing reagent gas, silicon-halogen compounds (eg chlorosilanes or bromosilanes), monosilane ($SiH_4$), and also mixtures of these gases with hydrogen are described. Such deposition processes and devices therefor are known, for example, from U.S. Pat. No. 4,786,477 A.

For producing high-purity polycrystalline silicon granules, silicon seed particles are necessary.

Gas jet mills, e.g. from U.S. Pat. No. 7,490,785 B2, are known for the production of such silicon seed particles. Such devices are suitable for producing silicon seed particles of a size of 50 µm to 1000 µm from silicon granules of a size of 300 µm to 5000 µm, and comprise a vertically arranged jet chamber having a cylindrical cross section having a jet nozzle at the bottom of the jet chamber, through which a milling gas stream can be introduced into the jet chamber, a counterflow gravity sifter directly following the jet chamber, and an intake for silicon granules, wherein the jet chamber is sufficiently long for an expansion of the milling gas stream to the cross section of the jet chamber, and the jet chamber has a smaller flow cross sectional area than the counterflow gravity sifter. The silicon granules are comminuted, in that a fluidized bed of high solids concentration forms from the silicon granules in the milling zone, individual silicon particles of the silicon granules in the cylindrical jet chamber in which only a low solids concentration is present are accelerated by a high-velocity milling gas stream and impact onto the fluidized bed of high solids concentration, wherein silicon granules and silicon particles shatter.

In one embodiment, parts of the device coming into contact with the silicon particles consist of an external metallic sheath having an inner wall which is provided with a coating. As coating, silicon in monocrystalline or polycrystalline form, or a plastic, is used.

However, it has been found that jet nozzles with coatings made of silicon or plastic are subject to high abrasion, in particular at the exit region of the nozzle.

US 2011/073689 A2 discloses a process for generating fine particles by means of a jet mill, wherein the milling gas has a pressure of <=4 bar (absolute) and a temperature of below 100° C. Likewise, a process for generating fine particles by means of a jet mill, using compressed gases as milling gas, is described, in which the milling gas has a pressure of <=4 bar (absolute) and a temperature of below 100° C., and in which, during the milling, a coating medium or doping medium is added in such a manner that at least parts of the surface of the particle are coated with the coating medium or doping medium.

If silicon seed particles having particle sizes of greater than 1250 µm are to be produced, the abovedescribed jet mills are not suitable. However, for the production of silicon seed particles of such a size, use can be made of roller crushers. JP 57-067019 A discloses the production of silicon seed particles by comminuting polycrystalline silicon in a roller crusher and subsequent fractionation by sieving. The rollers are prepared from high-purity silicon.

In this case, however, high abrasion of the silicon coating on the rollers occurs, in such a manner that only short running times of the machine are possible until the rollers must be replaced. Economic production of silicon seed particles is not possible thereby.

U.S. Pat. No. 7,549,600 B2 discloses a process for producing fine silicon fragments by comminution in a crusher, classifying the fine fragments, wherein a part of the crushed material having an edge length which is less than or equal to the maximum edge length of the desired fine silicon fragments (fraction 1) is collected in a collection container 1, and the part of the crushed material having an edge length which is greater than the edge length of the desired fine silicon fragments (fraction 2) is likewise collected. In one embodiment, from fraction 1, a part of the fine fragments which has an edge length which is less than the minimum length of the desired fine silicon particles, is extracted by sorting and collected (fraction 3). The resultant fractions 1 and 3 can be used as seed particles for depositing polycrystalline silicon in a fluidized-bed process. The crushing tools have a surface made of a hard metal (particularly preferably tungsten carbide in a cobalt matrix) or of silicon.

In this case, however, unwanted contamination of the silicon with B, C, Zn, Ti, Mg, W, Fe, Co, Sb and Zr occurs.

U.S. Pat. No. 5,637,815 A discloses a nozzle made of sintered SiC for use in fluidized-bed reactors, wherein reagents are introduced through the nozzle and are mixed or dispersed.

DE 100 520 21 B4 discloses a water jet cutter high-pressure nozzle, consisting of sintered WC powder. A water jet cutting machine is a machine tool for separating materials such as plastics, metals, leather and stones by means of a high-pressure water jet.

The objective of the invention resulted from the problems described.

SUMMARY OF THE INVENTION

A solution to the aforesaid problems is achieved by a process for producing silicon seed particles, for producing polycrystalline silicon granules in a fluidized-bed reactor, comprising introduction of a milling gas stream into a chamber containing polycrystalline silicon granules, as a result of which individual particles of the polycrystalline silicon granules are accelerated in such a manner that they collide with other particles of the polycrystalline silicon granules, and the polycrystalline silicon granules are thus comminuted, wherein the milling gas stream is introduced into the chamber by at least one jet nozzle made of hard metal. These and other objects are also achieved by a silicon seed particle which can be used for producing polycrystalline silicon granules in a fluidized-bed reactor, which has a size from 50 μm to 1000 μm having a mass median value from 300 μm to 500 μm, and also has the following contaminants on the surface thereof: carbon less than 1 ppmw, Fe less than 2 ppbw, Cr less than 0.5 ppbw, Ni less than 1 ppbw and tungsten less than 0.1 ppbw.

DETAILED DESCRIPTION OF THE PREFERRED EMBODIMENTS

Figure 1:
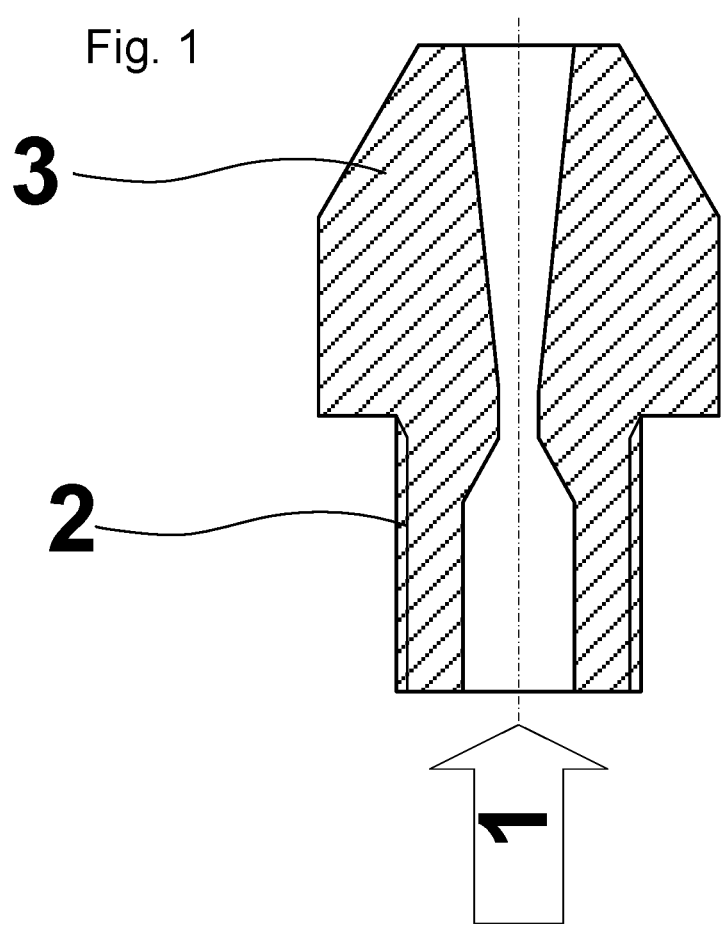
FIG. 1 shows the schematic structure of a jet nozzle.

The invention therefore provides directing a milling gas stream onto polycrystalline silicon granules by means of at least one jet nozzle made of hard metal, and milling the polycrystalline silicon granules by collisions among one another.

If the particles that are accelerated by the milling gas strike particles having a lower velocity, impact stress results, and the particles shatter depending on the impact energy.

The invention also relates to a device for comminuting polycrystalline silicon granules, comprising a vertically arranged jet chamber, and also a jet nozzle at the bottom of the jet chamber, through which a milling gas stream can be introduced into the jet chamber, a counterflow gravity sifter following directly the jet chamber, and an intake for a milling material, wherein the jet chamber has a length which is sufficient for an expansion of the milling gas stream to the cross section of the jet chamber, and the jet chamber has a smaller flow cross section than the counterflow gravity sifter, wherein the jet chamber has a cylindrical or polygonal cross section and internally has a multipart lining having silicon segments, and wherein the jet nozzle is made of hard metal.

The jet nozzle used is preferably a singly converging nozzle or a Laval nozzle. By means of a Laval nozzle, supersonic gas velocities may be generated at the nozzle exit.

Preferably, the jet nozzle consists of tungsten carbide (WC). More preferably, the jet nozzle is a jet nozzle made of WC having a binder matrix of cobalt. Preferably, metal carbides selected from the group consisting of titanium carbide, tantalum carbide, chromium carbide and vanadium carbide are additionally present.

Preferably, the jet nozzle consists of 84.5 to 93.4% tungsten carbide, 15 to 6% cobalt, and 0.5 to 0.6% metal carbides selected from the group consisting of titanium carbide, tantalum carbide, chromium carbide and vanadium carbide.

The particle size of the tungsten carbide is preferably 0.5-0.8 μm. In a particularly preferred embodiment, the particle size of the tungsten carbide is about 0.6 μm.

The composition corresponds to the ISO Code K05 to K40.

Preferably, the jet nozzle has a DLC (diamond-like carbon) coating. The layer thickness of the DLC coating is preferably 1 to 10 μm.

The jet nozzle cross section (internal diameter) is dimensioned in such a manner that exit velocities of greater than 300 m/s, preferably 400 to 800 m/s, are achieved. The jet nozzle preferably has an internal diameter from 3 mm to 6 mm.

Various disadvantages of the prior art can be avoided by the novel jet nozzles. In the case of the previously usually used jet nozzles made of plastic or silicon, premature abrasion due to extraction by washing at the jet nozzle tip occurs. The abrasion leads to deflection of the jet nozzle jet, altered gas exit velocity and thereby to a shortened service life of the jet nozzle and the milling chamber lining. An altered gas exit velocity, in addition, has an adverse effect on the particle size of the milling material. In addition, the abraded material of the jet nozzle sometimes is found on the milled Si material and impairs the quality thereof.

The polycrystalline silicon granules that are to be comminuted preferably have a size from 300 μm to 5000 μm. The silicon seed particles generated preferably have a size from 50 μm to 1000 μm, having a mass median value from 300 μm to 500 μm. The silicon seed particles generated preferably have the following contaminants on the surface: carbon less than 1 ppmw, Fe less than 2 ppbw, Cr less than 0.5 ppbw, Ni less than 1 ppbw and tungsten less than 0.1 ppbw.

The polycrystalline silicon granules can be comminuted in situ in a fluidized-bed reactor. In this case, a single high-velocity gas jet is generated which comminutes a part of the Si granules in the fluidized bed to form silicon seed particles.

Equally preferred is the use of a jet mill or counterflow jet mill. For this purpose, the device described in U.S. Pat. No. 7,490,785 B2 is suitable. With respect to the specific design of the jet mill, in particular with respect to the counterflow gravity sifter described there, U.S. Pat. No. 7,490,785 B2 is hereby incorporated by reference in its entirety. In a departure from U.S. Pat. No. 7,490,785 B2, a jet nozzle made of hard metal, eg WC, is used. A further difference is in the design of the jet chamber.

Preferably, the device, in a departure from U.S. Pat. No. 7,490,785 B2 in particular has a vertically arranged jet chamber having a polygonal cross section.

More preferably, the device has a vertically arranged jet chamber having an octagonal cross section.

Preferably, the jet chamber comprises a metallic outer shell, wherein, between outer shell and silicon lining, a detection layer is located which is suitable for ascertaining detectable damage to the silicon lining. For this purpose, the detection layer comprises a substance that is detectable on the milling material. By contamination of the milling material with the detectable substance, damage to the lining is detectable. The milling material is preferably polycrystalline silicon granules. Carbon and metals, for example, are readily detectable on polycrystalline silicon. Therefore, detection layers made of plastic which contain carbon or metals are particularly preferred.

The jet nozzle is preferably operated using milling gas of high purity. High purity is taken to mean that contaminants are present in amounts of less than 5 ppmv. The milling gas is preferably air, argon, helium, nitrogen, or mixtures of these gases.

A particularly preferred jet nozzle shape is the Laval geometry, in order to achieve supersonic velocity at the exit opening of the jet nozzle.

The external geometry of the jet nozzle is preferably adapted to reception in the jet chamber and is shaped to be favorable to flow in the product-contact region.

The jet nozzle can be constructed as a screw-in body, similar to a screw having different heads (flat, cylindrical, hexagonal, countersunk head).

The attachment can be made from the inside towards the outside or from the outside towards the inside.

The jet nozzle can also be clamped as a clamp body into a device of the jet chamber.

In the selection of the jet nozzle shape, attention should be paid to a design particularly favorable to flow in the product-contact region.

The invention also relates to a process for producing polycrystalline silicon granules, comprising fluidizing silicon seed particles that are produced by means of the process described hereinbefore by means of a gas stream in a fluidized bed which is heated up by means of a heating device, wherein, by addition of a silicon-containing reaction gas, by means of a thermochemical reaction, polycrystalline silicon is deposited on the hot silicon seed particle surfaces, as a result of which the polycrystalline silicon granules are formed.

Preferably, the process is operated continuously, by removing from the reactor particles that have grown in diameter by deposition, and adding fresh silicon seed particles.

The silicon-containing reaction gas can be monosilane. The temperature of the fluidized bed in the reaction zone is preferably 600-850° C.

However, the silicon-containing reaction gas can also be trichlorosilane. The temperature of the fluidized bed in the reaction zone in this case is preferably 800-1200° C., more preferably 900-1050° C., and most preferably 920-970° C.

The fluidizing gas is preferably hydrogen.

The reaction gas is injected into the fluidized bed via one or more nozzles. The local gas velocities at the exit of the nozzles are preferably 0.5 to 200 m/s.

The concentration of the silicon-containing reaction gas is, based on the total gas amount flowing through the fluidized bed, preferably 10 mol % to 50 mol %, more preferably 15 mol % to 40 mol %.

The concentration of the silicon-containing reaction gas in the reaction gas nozzles is, based on the total gas amount flowing through the reaction gas nozzles, preferably 20 mol % to 80 mol %, more preferably 30 mol % to 60 mol %.

The reactor pressure ranges from 0 to 7 bar gauge, preferably in the range 0.5 to 4.5 bar gauge.

In the case of a reactor having a diameter of, e.g., 400 mm, the mass flow rate of the silicon-containing reaction gas is preferably 200 to 600 kg/h. The hydrogen volumetric flow rate is preferably 100 to 300 m³(S.T.P.)/h. For larger reactors, higher rates of silicon-containing reaction gas and $H_2$ are preferred.

Since some process parameters are ideally selected in dependence on the reactor size, hereinafter, operating data normalized to the reactor cross sectional area are discussed, in which the process described in the context of this invention has particular usefulness.

The specific mass flow rate of the silicon-containing reaction gas is preferably 1600-6500 kg/(h·m²).

The specific hydrogen volumetric flow rate is preferably 800-4000 m³(S.T.P.)/(h·m²).

The specific bed weight is preferably 700-2000 kg/m².

The specific silicon seed particle metering rate is preferably 7-30 kg/(h·m²).

The specific reactor heating power is preferably 800-3000 kW/m².

The residence time of the reaction gas in the fluidized bed is preferably 0.1 to 10 s, more preferably 0.2 to 5 s.

The features cited with respect to the abovedescribed embodiments of the process according to the invention can be applied correspondingly to the device according to the invention. Vice versa, the features cited with respect to the abovedescribed embodiments of the device according to the invention can be applied correspondingly to the process according to the invention. These and other features of the embodiments according to the invention are explained in the description of the figures and the claims. The individual features can be implemented either separately or in combination as embodiments of the invention.

In the exemplary embodiments, or forms or variant embodiments, described hereinafter, functionally or structurally similar elements are provided as far as possible with the same or similar reference signs. Therefore, for understanding the features of the individual elements of a certain exemplary embodiment, reference should be made to the description of other exemplary embodiments, or the general description of the invention.

LIST OF THE REFERENCE SIGNS USED

1 Milling gas
2 Shaft
3 Jet nozzle head
4 Jet nozzle
5 Jet chamber
6 Outer shell
7 Detection layer
8 Lining The jet nozzle geometry may be seen in FIG. 1.

The external shape of the jet nozzle is reminiscent in this example of the geometry of a screw. The shaft 2 serves for receiving the jet nozzle in the device (eg jet mill) and generally consists of a metric or imperial thread, but can also be constructed as a clamping or click fastener. The shaft 2 does not come into contact with the milling material. The jet nozzle head 3 comes into contact with the product. In order to ensure a firm seating of the jet nozzle in the device, key surfaces are mounted on the jet nozzle head, at which the jet nozzle can be fastened in the device using a suitable assembly tool. For sealing the jet nozzle body to the device, sealing is either accomplished in the thread, or a separate seal is achieved between jet nozzle head and device. The product-contact jet nozzle head is constructed in a manner promoting flow towards the outflow region.

Figure 2:
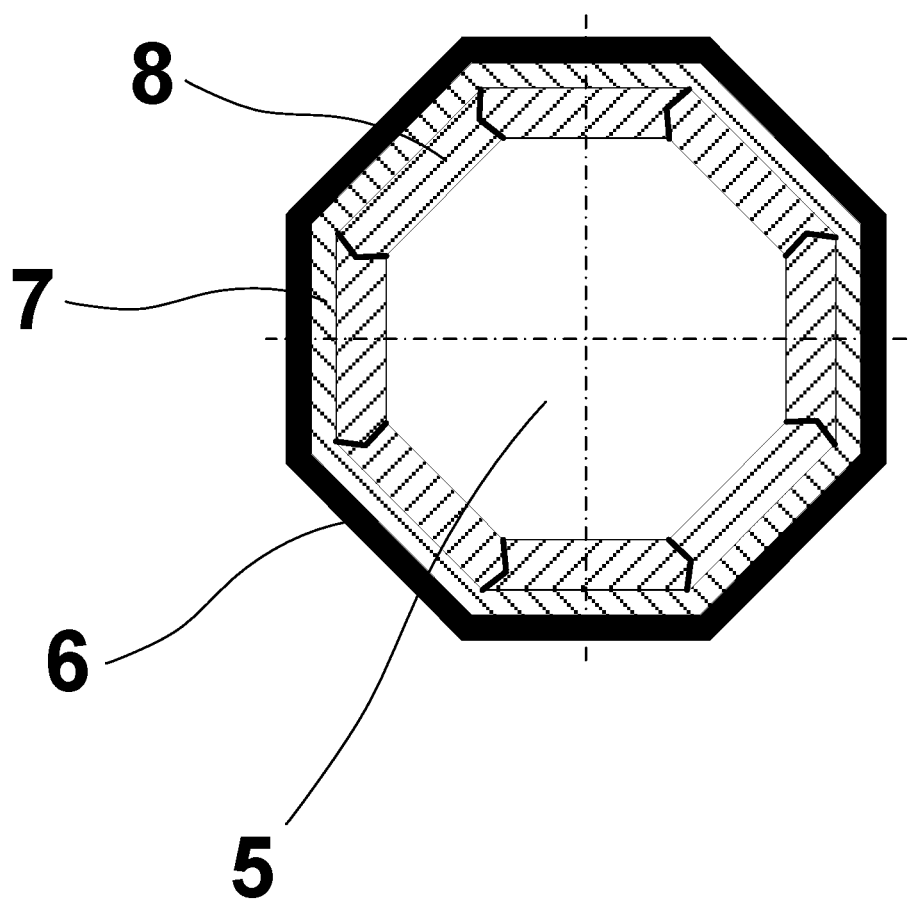
FIG. 2 shows the polygonal cross section of a jet chamber.

Furthermore, the invention preferably comprises a jet chamber having a polygonal cross sectional area (cf. FIG. 2).

In U.S. Pat. No. 7,490,785 B2, a jet chamber having a cylindrical cross sectional area is described.

A polygonal jet chamber, in comparison with the cylindrical cross sectional area, has the advantage that the lining 8 can be designed in a multipart manner, in particular, eg, can be composed of individual planar moldings which, in a preferred embodiment, consist of high-purity silicon.

As a result, in contrast to a cylindrical lining constructed in one piece over the entire periphery, which is only available in limited diameters, a cross sectional area of any desired size can quasi be formed. The milling performance and the milling quality are not fundamentally influenced by the polygonal cross section of the jet chamber 5.

Figure 3:
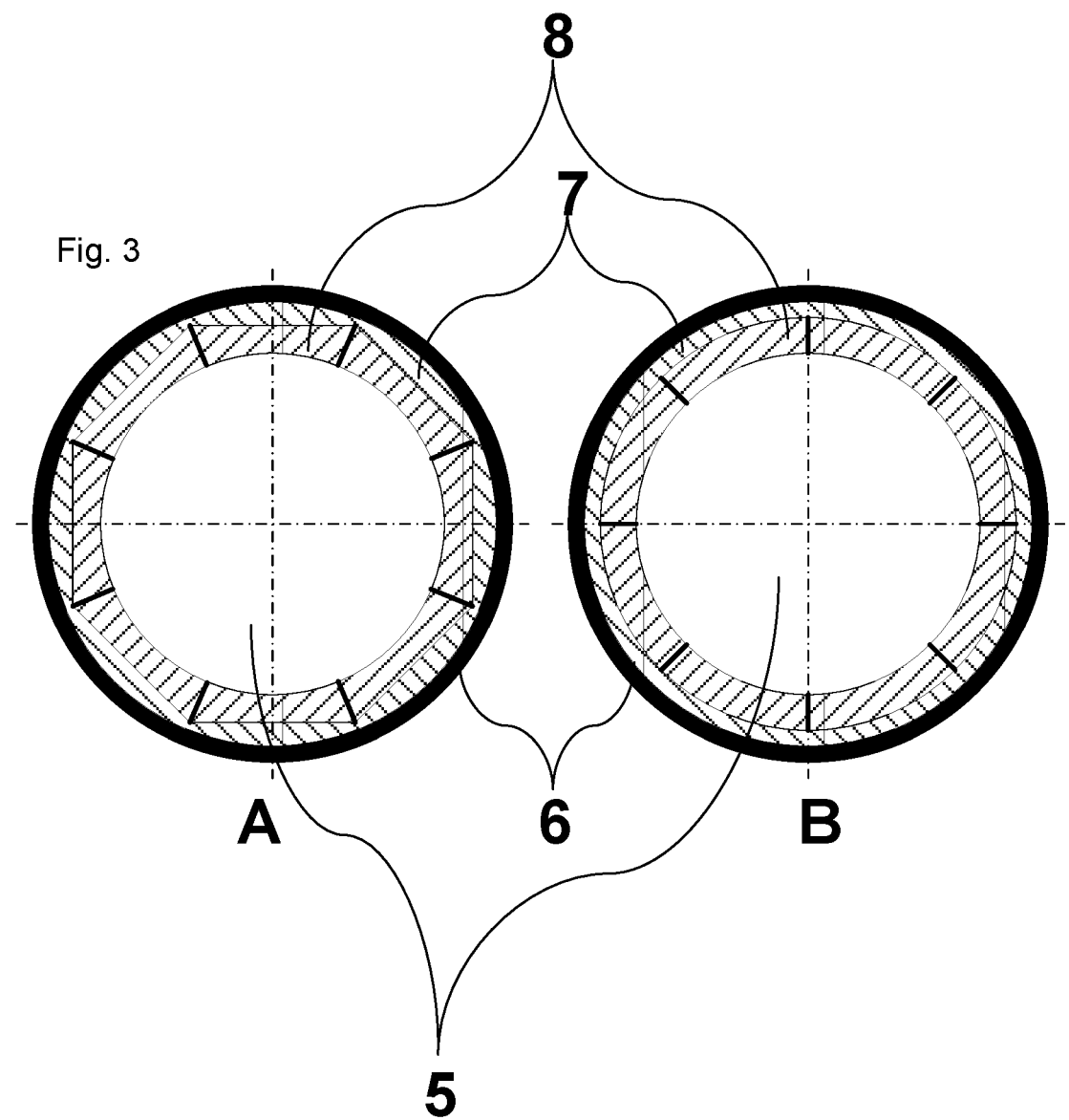
FIG. 3 shows two embodiments of cross sections of a jet chamber.

With a large cross sectional area, a plurality of jet nozzles can be installed, and thereby a high milling performance achieved. However, it is also possible to provide a cylindrical jet chamber 5 and to construct the lining 8 of the jet chamber in segmental manner, similarly to the polygonal jet chamber 5. This preferred embodiment is shown in FIG. 3 B.

Figure 4:
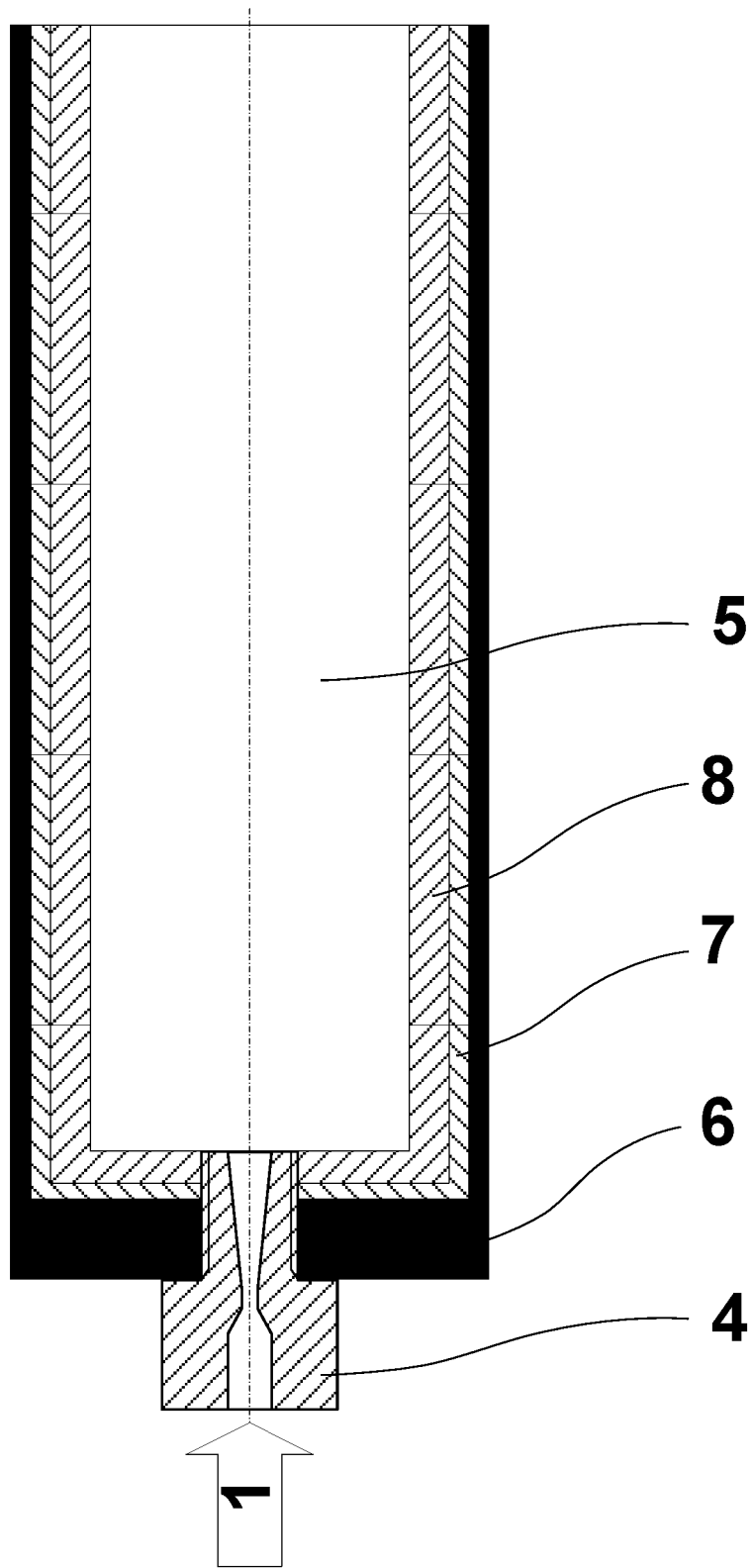
FIG. 4 shows a jet chamber having an installed jet nozzle.

FIG. 4 shows an installed example of a jet nozzle 4 in a jet chamber 5. The jet nozzle head seals flush with a high-purity lining 8, which consists of mono- or polycrystalline silicon. The jet nozzle body is fastened by means of a thread in the bottom of the metallic outer shell 6.

Between outer shell 6 and lining 8 there is situated a carbonaceous detection layer 7, e.g. made of polypropylene. Using such a detection layer 7, points of damage to the linings 8 may be observed via an easily detectable contamination of the milling material. Carbon may be detected in small traces via a carbon analyzer. Alternatively, the detection layer can also consist of plastic containing a metallic component. Metal may likewise be resolutely detected in the milling material.

The description hereinbefore of exemplary embodiments is to be understood as an example. The disclosure made thereby permits a person skilled in the art, firstly, to understand the present invention and the advantages associated therewith, and secondly also comprises amendments and modifications of the structures and processes described that are obvious within the understanding of a person skilled in the art. Therefore, all such amendments and modifications, provided that they come within the scope of the invention according to the definition in the accompanying claims, and also equivalents, shall be covered by the protection of the claims.

Example and Comparative Example

In a milling system according to U.S. Pat. No. 7,490,785 B2, a jet nozzle made of polyamide (comparative example) is replaced by a jet nozzle made of tungsten carbide (example) in accordance with ISO Code K05-K10.

The inner contour of the jet nozzle is constructed as a Laval nozzle having a diameter of 4 mm. The jet chamber geometry was identical in the example and comparative example.

Table 1 shows the carbon and tungsten contamination of the silicon seed particles produced, and also the service life of the nozzles.

Jet nozzles made of polyamide achieve a mean service life of only 15 tons of silicon seed particles. Then, the jet nozzle must be replaced on account of abrasion and the associated milling characteristics that are becoming poorer.

Using an identical type of jet nozzle made of tungsten carbide, the milling system was operated using identical parameters (milling gas stream, metering rate of the feed material) and the jet nozzle abrasion and the product quality were monitored after certain stopping points.

TABLE 1

|  | Comparative example | Example |
|---|---|---|
| Jet nozzle | Polyamide | WC |
| Contamination with carbon [ppmw] | 1.6 | 0.6 |
| Contamination with tungsten [ppbw] | 0.091 | 0.092 |
| Service life [tons of silicon seed particles] | 15 | >200 |

At a target product amount of 100 tons, there was no abrasion measurable on the jet nozzle (weight, dimensions, SEM images). The product quality had improved with respect to carbon. Jet nozzles made of WC therefore obviously give off less carbon to the product than the jet nozzles made of PA.

By means of mass spectrometry, starting material (polycrystalline silicon granules) and milling product (silicon seed particles) were examined for metallic contamination.

The values of the milling product are above the starting level by a max. 0.01 ppbw both for tungsten (cf. table 1) and for cobalt. Compared with a metal-free plastics nozzle, surprisingly, scarcely any difference can be recognized.

The particular advantages of the invention are therefore that no, or only minimal, abrasion of the jet nozzle made of hard metal is observable. As a result, the jet nozzle geometry remains constant and ensures constant milling performance and milling quality. The hard metal nozzle exhibits a virtually unlimited service life. In addition, no, or only minimal, product contamination by the jet nozzle material is recognizable.

The invention claimed is:

1. A process for producing silicon seed particles, suitable for producing polycrystalline silicon granules in a fluidized-bed reactor, comprising introducing a milling gas stream into a chamber containing polycrystalline silicon granules, accelereating individual particles of the polycrystalline silicon granules such that the accelerated particles collide with other particles of the polycrystalline silicon granules, and the polycrystalline silicon granules are comminuted, wherein the milling gas stream is introduced into the chamber by at least one jet nozzle comprising 84.5 to 93.4 wt. % tungsten carbide in a binder matrix of 15 to 6 wt. % cobalt, and also containing 0.5 to 0.6 wt. % of one or more metal carbides selected from the group consisting of titanium carbide, tantalum carbide, chromium carbide and vanadium carbide.

2. The process of claim 1, wherein the tungsten carbide has a particle size of 0.5-0.8 μm.

3. The process of claim 1, wherein the jet nozzle is a Laval nozzle.

4. The process of claim 2, wherein the jet nozzle is a Laval nozzle.

5. The process of claim 1, wherein the at least one jet nozzle has a diamond-like carbon coating having a thickness of 1 to 10 μm.

6. The process of claim 1, wherein an exit velocity of the milling gas stream from the at least one jet nozzle is greater than 300 m/s.

7. The process of claim 1, wherein an exit velocity of the milling gas stream from the at least one jet nozzle is greater than 400 to 800 m/s.

8. The process of claim 1, wherein the polycrystalline silicon granules that are to be comminuted have sizes ranging from 300 μm to 5000 μm, and the silicon seed particles produced have sizes ranging from 50 μm to 1000 μm.

9. The process of claim 1, wherein the comminution of the polycrystalline silicon granules takes place in a fluidized-bed reactor in a jet mill or a counterflow jet mill, wherein a single gas jet is generated which comminutes a part of the polycrystalline silicon granules in the fluidized bed to form silicon seed particles.

10. The process of claim 9, wherein a vertically arranged jet chamber of the jet mill or of the counterflow jet mill has a cylindrical or polygonal cross section and comprises an internal multipart lining of silicon segments, wherein the at least one jet nozzle is mounted on a bottom of the jet chamber.

11. The process of claim 1, wherein the comminution of the polycrystalline silicon granules takes place in a jet mill or in a counterflow jet mill.

* * * * *